(12) United States Patent
Midavaine

(10) Patent No.: US 9,025,004 B2
(45) Date of Patent: May 5, 2015

(54) OPTRONIC SYSTEM HAVING SUPRA-HEMISPHERIC VISION

(75) Inventor: Thierry Midavaine, Paris (FR)

(73) Assignee: Thales, Courbevoie (FR)

( * ) Notice: Subject to any disclaimer, the term of this patent is extended or adjusted under 35 U.S.C. 154(b) by 252 days.

(21) Appl. No.: 13/823,069

(22) PCT Filed: Sep. 12, 2011

(86) PCT No.: PCT/EP2011/065721
§ 371 (c)(1),
(2), (4) Date: Mar. 13, 2013

(87) PCT Pub. No.: WO2012/034963
PCT Pub. Date: Mar. 22, 2012

(65) Prior Publication Data
US 2013/0176386 A1    Jul. 11, 2013

(30) Foreign Application Priority Data
Sep. 14, 2010   (FR) ..................... 10 03654

(51) Int. Cl.
*H04N 5/00*       (2011.01)
*H04N 5/232*     (2006.01)
*G02B 27/01*     (2006.01)
*H04N 5/365*     (2011.01)
*G02B 13/06*     (2006.01)
*G02B 27/00*     (2006.01)
(Continued)

(52) U.S. Cl.
CPC ............ *H04N 5/23238* (2013.01); *G02B 13/06* (2013.01); *G02B 27/0093* (2013.01); *G02B 27/017* (2013.01); *G02B 2027/011* (2013.01); *G02B 2027/0138* (2013.01); *G02B 2027/014* (2013.01); *G02B 2027/0147* (2013.01); *H04N 5/33* (2013.01); *H04N 5/347* (2013.01); *H04N 5/3651* (2013.01); *H04N 5/3745* (2013.01); *H04N 5/378* (2013.01)

(58) Field of Classification Search
USPC .......................................................... 348/36
See application file for complete search history.

(56) References Cited

U.S. PATENT DOCUMENTS 5,023,725 A * 6/1991 McCutchen .................... 348/38
6,449,103 B1    9/2002 Charles
(Continued)

FOREIGN PATENT DOCUMENTS

EP    0776124 A2    5/1997
FR    2826221 A1    12/2002
(Continued)

*Primary Examiner* — Sath V Perungavoor
*Assistant Examiner* — Jeffery Williams
(74) *Attorney, Agent, or Firm* — Baker Hostetler LLP

(57) ABSTRACT

A video optronic system, comprises a sensor with a supra-hemispheric lens and a matrix detector array, a unit for processing the sensed images, display means for the processed images. The matrix detector, having video rate, comprises: i. L×C pixels, with L and C>2000, each employing correlated double sampling and able to ensure a charge-voltage conversion, and ii. 2 C parallelized analog-digital conversion elements, each comprising a first ADC with output having low level and large gain and a second ADC with output having high level and low gain; the lens exhibits a focal length controlled by the angle of elevation, the focal length being longest in the equatorial plane, and has a numerical aperture lying between 0.9 and 1.6; and the processing unit comprises: i. means for correcting the non-uniformities, ii. means of weighted summation, of several neighboring pixels, iii. means for adapting and compressing the sensed image.

5 Claims, 1 Drawing Sheet

(51) Int. Cl.
*H04N 5/33* (2006.01)
*H04N 5/347* (2011.01)
*H04N 5/3745* (2011.01)
*H04N 5/378* (2011.01)

(56) References Cited

U.S. PATENT DOCUMENTS 6,844,990 B2  1/2005  Artonne et al.
6,865,028 B2  3/2005  Moustier et al.
2004/0169726 A1  9/2004  Moustier et al.
2005/0046715 A1  3/2005  Lim et al.
2008/0151084 A1  6/2008  Lu et al.

FOREIGN PATENT DOCUMENTS

FR  2827680 A1  1/2003
WO  2005/029865 A1  3/2005

* cited by examiner

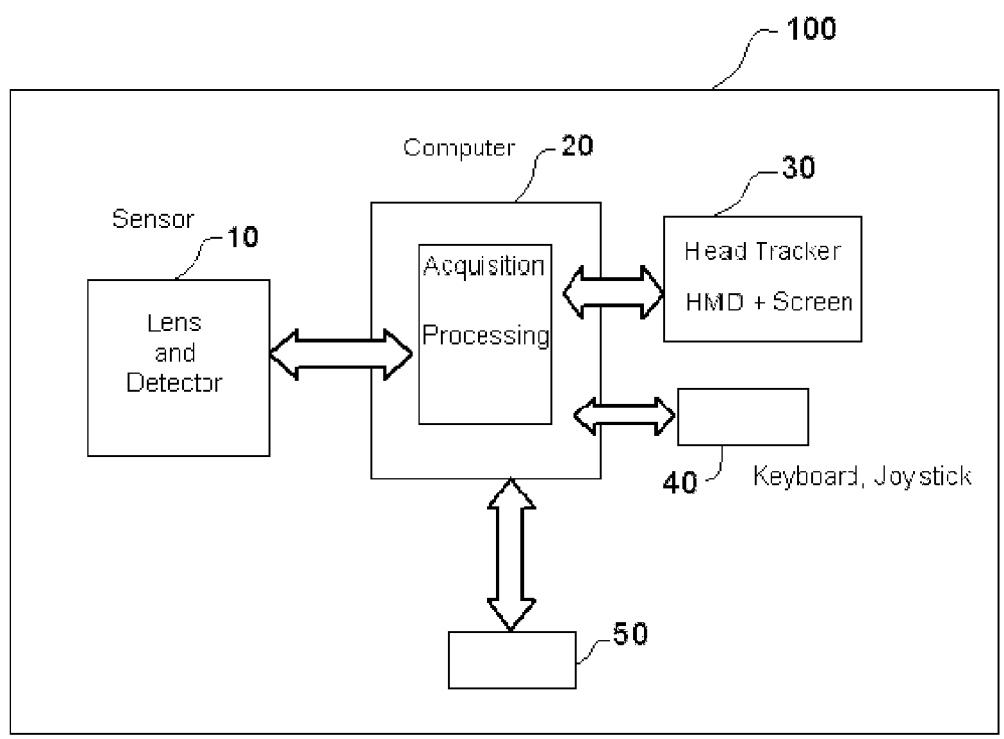

OPTRONIC SYSTEM HAVING SUPRA-HEMISPHERIC VISION

CROSS-REFERENCE TO RELATED APPLICATIONS

This application is a National Stage of International patent application PCT/EP2011/065721, filed on Sep. 12, 2011, which claims priority to foreign French patent application No. FR 1003654, filed on Sep. 14, 2010, the disclosures of which are incorporated by reference in their entirety.

FIELD OF THE INVENTION

The field of the invention is that of observation and surveillance for the protection of a vehicle, of a convoy of vehicles, of a platform (terrestrial, naval or airborne), or of a site.

This observation or surveillance is generally ensured by an observer or a crew onboard a platform; it may optionally be remotely controlled.

BACKGROUND

Among the existing devices for ensuring this surveillance mission may be cited the following devices which use:
- a ring of episcopes or periscopes which pass through the armor, walls and means of protection in main battle tanks, or
- a camera mounted on a steerable mount that can be oriented in relation to two axes, of PTZ type, the acronym standing for the expression Pan Tilt Zoom, which does not make it possible to cover the entire panorama instantaneously or
- a network of several distributed cameras covering the panorama, which make it necessary to manage a video stream network, or
- a linear array type sensor, at the focus of a lens, the whole scanning over 360° the scene in the equatorial plane for example at rates of 1 to 10 Hz.

These means of optronic type deliver signals which are optionally processed and then displayed on screens.

These means are very insufficient:
- either because they do not make it possible to have a complete perception of the whole of the environment that may exhibit numerous dead angles; it is important for example for a vehicle moving in urban surroundings and that can also maneuver in various directions, with threats that may originate from various directions,
- or because the resolution is very insufficient with respect to the angular dimensions of the objects, events or threats to be detected having regard to the range at which it must be possible to discriminate them. This indeed entails:
    - recognizing up to 150 m range, snipers that may be threatening with a grenade launcher (or RPG, the acronym standing for the expression Rocket Propelled Grenade), or who make take up position on the roofs of buildings in urban surroundings,
    - recognizing vehicles moving on the ground, within a radius of up to 500 m; in urban surroundings it is rare to go beyond, in open surroundings detection is possible at distances of 1500 m,
    - recognizing objects placed on the ground such as mines (or IEDs, the acronym standing for the expression Improvised Explosive Device): objects with a dimension of a few tens of cm or of m, situated a few tens of meters away must be able to be detected so as to decide to avoid them on the move,
- or because the refresh rate is very insufficient to substitute for perception close to human capability, that is to say to have a continuous perception in real time of the environment and of its evolution having regard to the speed of movement of the vehicle and of the reaction decisions that may be taken by the crew. There exist for example devices relying on the use of a lens associated with a CCD camera, which scan the equatorial plane on 360° at rates of 1 to 10 Hz and are limited in angular height to some twenty or so degrees: these devices rely either on small matrices (2 Mpixels or less) so as to be compatible with a High Definition video rate (HD 25 to 50 Hz), or on large matrices of greater than 2 Mpixels but limited in rate (of the order of 1 to 10 Hz) or else on linear arrays scanning the 360° which are likewise limited to scan frequencies of 1 to 10 Hz.

Finally all these earlier means are limited to daytime operation, being sensitive in the visible or near infrared domain or may offer a night vision capability of thermal infrared type that is insufficient to discern threats and delivering by day images that are less easily utilizable than the images afforded by visible or near infrared cameras.

Consequently, to date there remains a need for a system that simultaneously satisfies all of the aforementioned requirements, in terms of field of vision, resolution, permanence of observation, rate and day/night vision.

SUMMARY OF THE INVENTION

More precisely the subject of the invention is a video optronic system with supra-hemispheric vision of a scene, which comprises a sensor with a supra-hemispheric lens and a matrix detector array situated in the focal plane of the lens, a processing unit the acquired images and display means for the processed images. It is mainly characterized in that:
- the matrix detector is one having video rate and comprises:
    i. L×C array of pixels, with L and C>2000, each pixel employing correlated double sampling and able to ensure charge-voltage conversion, and
    ii. 2 C parallelized analog-digital conversion elements, each conversion element itself comprising a first ADC with output having low level and large gain and a second ADC with output having high level and low gain,
- in that the supra-hemispheric lens exhibits a focal length f controlled as a function of the angle of elevation, the focal length being longest in the equatorial plane, and has a f/number f/D lying between 0.9 and 1.6, D being the diameter of the lens,
- means for adapting the dynamic range of the acquired image to the dynamic range of the scene, by control of the exposure time, and/or of the gain applied to the signal,
- and in that the processing unit comprises:
    i. means for correcting the non-uniformities of the detector by means of command tables adapted as a function of temperature and of exposure time of the detector,
    ii. means of weighted summation of several neighboring pixels,
    iii. means for adapting the dynamic range of the acquired image to the dynamic range of the scene, means for compressing the dynamic range of the sensed image as a function of the temporal noise of the detector, increasing with the illumination of the scene, means for adapting the dynamic range of the sensed image to the dynamic range of the display screen and/or to that of the eye, by restoration of the high spatial frequencies of the image and compensation of the low spatial frequencies.

According to a characteristic of the invention, it comprises means for defining the focal length of the lens and means for correcting the distortions as a function of a sector of the observed scene.

The sensor ensures hemispherical or greater coverage, with a resolution adapted to the dimensions and positions of potential threats. The multi-mega pixel sensor can be read at video rate or even at greater rates with a sensitivity level that can be adjusted from day illumination levels up to night illumination levels while being compatible with the presence of luminous sources in the scene. The latter aspect is advantageous for uses in an urban zone.

A set of processing functions distributed in the sensor and in the computer makes it possible to deliver images on the screen or screens of the MMIs (Machine Man Interfaces) with inlays adapted to the users' missions.

The subject of the invention is also a platform able to move, equipped with a video optronic system having supra-hemispheric vision, such as described.

The invention thus allows the user to have the perception of his exterior environment in real time while remaining within the platform without requiring him to get out. In particular in a military context or a dangerous environment the system helps to protect the crew. It indeed makes it possible to offer the user total real-time day and night vision at video rate, with a resolution adapted to the angular dimension of these threats having regard to their distance and to their potential positions in the panorama.

BRIEF DESCRIPTION OF THE DRAWINGS

Other characteristics and advantages of the invention will become apparent on reading the detailed description which follows, given by way of nonlimiting example and with reference to FIG. 1 which schematically represents an exemplary system according to the invention.

DETAILED DESCRIPTION

The system 100 according to the invention shown in FIG. 1, comprises a sensor 10, a computer 20, a MMI interface 30 intended for the user such as an image display device and an MMI interface 40 such as a device for control by the user of certain functions of the system.

Moreover the system can receive information originating from the platform or other equipment 50 integrated on the platform, such as the measurement of its speed of movement, its location and its orientation on a map (delivered for example by a GPS system), or else the reception of information giving the location of soldiers or of other friendly mobile platforms for example.

It is installed aboard a platform such as a terrestrial vehicle.

The sensor 10 comprises a lens and a detector.

The very high aperture lens, with variable resolution in the field, covers an angular domain of greater than a hemisphere whose axis is oriented toward the zenith. The lens can furthermore exhibit significant distortions so as to offer increased resolutions in certain angular domains, for example in the equatorial plane, to increase its range.

This lens is for example of the following types:
Fish eye with a focal length of 4.5 mm and 12 pixels/°; 1 or 2 lenses suffice to cover a field of 360°,
Fish eye with a focal length of 8 mm and 21 pixels/° over 120°; 3 lenses are necessary to cover a field of 360°,
Lens having very large distortion or of Panomorph™ type making it possible to cover a field of 360°, with a radial resolution varying according to angle of elevation that may go from 20 to 22 pixels/° or more in radial resolution (1 such lens suffices); the vertical orientation of such a lens makes it possible to have a tangential resolution that increases with decreasing angle of elevation and is better for negative elevations. The Panomorph™ lens is a wide-angle anamorphic objective developed by the company Immervision and described in patents FR 2826221 and FR 2827680, which controls the distortions and produces a magnified image covering a field of vision of at least 360 degrees by 180 degrees. The geometry of the image formed by such a lens (adapted to our need as indicated) on the detector, shows a coverage of 360° in bearing or in an equatorial plane, by 220° in elevation or in the meridian planes.

The angular coverage in the meridian planes over 220° may differ as a function of azimuth so as to optimize installation on the vehicle and increase the coverage for example on the front sector and ¾ rear left and right where the vehicle can progress or maneuver. This supra-hemispheric lens exhibits a variable focal length f defined as a function of the angle of elevation, the focal length being longest in the equatorial plane, and with a f/number f/D lying between 0.9 and 1.6, D being the diameter of the lens.

The detector operates at video rate (25 to 50 Hz) or greater in the visible or the near infrared by day and by night and comprises at least 5 Mega pixels. It comprises for example 2560 rows (L)×2160 columns (C) of pixels. The detector of CMOS type furthermore allows modes of reading and of display and controls of exposure time that are adapted to the conditions as will be seen further on. Finally this type of detector can deliver a digital signal directly.

The detector situated in the focal plane is typically a CMOS 4T (with 4 transistors in the pixel) or more matrix, operating at 25 Hz, with low noise (less than 2 electrons) and large dynamic range (greater than 80 dB). Each pixel employs correlated double sampling and the charge-voltage conversion is carried out in each pixel, thereby ensuring that the detector has a very low noise level and a large instantaneous dynamic range. Furthermore the control of the exposure time (or integration time), from durations of less than 10 µs to durations of 40 ms for example, allows it to operate by day and by night. In nighttime conditions, at very low level, it is possible to increase the exposure time for example to 100 ms and to reduce the image rate for example to 10 Hz so as to improve the SNR (Signal on Noise Ratio) of the restored image.

The detector operates in the near IR (650 nm-1 µm), which can be preferred to the visible domain for night vision, so as to utilize the photon fluxes and the contrasts of the greater albedos of this band.

With each column of the matrix are associated for example two identical parallelized ADCs, one having an input with low gain with high light level making it possible to code the saturating level of the pixels (for example 35000 electrons) and the other having an input with large gain with low light level by virtue of a gain (coding the photoelectrons with a quantization level that is less than the noise or less than 1 electron over a dynamic range of N bits). These two gains are optionally controllable: this makes it possible to ensure the coding of the signal without loss of the output of the pixels of each column for various light levels. In addition to this instantaneous dynamic range and this dynamic swing of gains of the outputs of the detector, there is a controllable dynamic swing of the exposure times making it possible to vary the exposure time between 10 µs and 40 ms or even 100 ms by reducing the rate to 10 Hz. This real-time command of the levels of the exposure time, of the low gain and of the high gain level exiting in parallel is obtained either by the MMI 40 which controls these levels, or by an automatic control function ensured by a processor in the camera. The operator adjusts via two cursors controlling the brightness and the contrast of the image restored on screen in the following manner:

by switching to manual mode the camera retains the latest settings generated by the automatic control mode, or the operator chooses to initialize the camera to its "default" state where the camera is set with a minimum exposure time of 10 µs and a low gain. If he notes that he cannot discern the signal in the dark zones of the image he sets the brightness control higher via an offset control for the signal. If the signal does not saturate in the useful bright zones of the image, he sets the contrast control higher. This control of contrast acts: on the control of the exposure time by increasing it within the limit of 40 ms, and then on the gain employed. At very high gain (for conditions of very low illumination), if he notes excessive noise in the dark zones of the image, he can still increase the exposure time beyond 40 ms and order the mode of summation of the adjacent pixels (or "binning") 2×2 and then 4×4. Preferably this summation or "binning" can be weighted by the noise level of each pixel. He readjusts if necessary the brightness level so as to adjust the dark zones of the image to a level just above the black of the screen. It can thus operate at high throughput, at 25 images per second, i.e. of the order of 138 Mpixels/sec without degrading the SNR in the dynamic range of the image.

The system 100 ensures the following functions:

Real-time correction of the non-uniformities of the detector, carried out by an FPGA or a DSP integrated into the sensor 10 or carried out at the level of the computer 20. It performs at least the subtraction of the offset, the subtraction of the dark current by means of tables of corrections adapted as a function of temperature and of exposure time of the detector, and the division by a uniform luminance field or flat field which ensures correction of the non-uniformities of response of the pixels. In addition the computer will be able to take into account the non-linearities of response for each pixel and non-uniformities of the temporal noise level of each pixel so as to improve the global signal-to-noise ratio in the image thus restored.

Image rate control carried out by the electronics of the camera controlling the detector, either automatically or ordered manually by the operator so as to vary the rate from 25 to 100 Hz. Such a mode may be very useful on the move under diurnal conditions or if the lower illumination levels so permit in order to increase the fluidity of the images and reduce the latency time, a weighted "binning" mode for summing the signals S of the neighboring pixels weighted for example with the inverse of the noise (1/Noise) of each pixel and by multiplying the whole by the sum of the noise. This weighted "binning" mode can be on 2×2, 3×3 or 4×4 pixels for example.

A linear output on 16 bits of the detector since a linear output on 12 bits is insufficient in relation to the dynamic range of the scene and to the dynamic range of the sensor; the digitization on 2×11 bits is at the limit of the analog performance of the sensor and in the fineness of the operations for correcting non-uniformity. The pixel is able to have a RMS (acronym standing for the expression Root Mean Square) noise level of less than 1 electron. A RMS noise of 0.5 electron has been measured on the least noisy pixels for a digital signal coded with 0.6 electron per interval and lower noise levels are without doubt achievable. The weakest signals may in fact be with a signal at 0 in total darkness, and then of 1 photo-electron on a pixel; therefore a coding interval of less than 1 electron or indeed of less than the RMS noise level is worthwhile for the signal processing so as to limit the noise contributed by the digital coding. This RMS quantization noise is equal to the quantization interval divided by $\sqrt{2}$. Here this quantization noise is equal to $0.6/\sqrt{12}=0.17$, which is actually small relative to the RMS noise of 0.5 electron. The pixel may have a saturating level of greater than 35000 electrons. Therefore a linear coding on 65536 levels or 16 bits comes close to our need. A coding by two converters of smaller dynamic range with two different input gains may be better adapted (coding with two slopes). Thus the low-gain coding on 11 bits will code the high levels on 2048 levels from 17 to 35000 electrons in intervals of 17 electrons. The high-gain coding will code from the lowest levels adapted to the noise in darkness (0.5 electron for example) to levels greater than the square of the minimum level of the low-gain converter i.e. 292 at the minimum. Indeed the RMS noise of a signal of amplitude equal to N photo-electrons in accordance with a statistic described by Poisson's law has an amplitude equal to $\sqrt{N}$; thus onward of this level of 292 the RMS noise becomes smaller than the quantization interval. Thus a coding from 0 to 1024 electrons can be carried out with a coding interval of 0.5 electron under 11 bits for the high-gain output. The ratio of the gains between the high-gain and low-gain output is thus 35000/1024 i.e. 34. A conversion on 2×12 bits is preferable so as to have some margin with respect to the previous analysis in order to carry out the arithmetical operations for correcting non-uniformities and non-linearity while limiting the impact of the quantization levels on the resulting final noise and to make it possible to achieve a lower noise level and higher potentially achievable saturation levels, A management of the table for converting the signal at output (known as a "look up table") after the operations for correcting non-uniformity and non-linearity so as to compress the image levels corrected by different laws over the whole of the dynamic range of the scene: response to several slopes, root response, logarithmic response, histogram equalization for example. This makes it possible to preserve the dynamic range of the signal while reducing with a minimum of loss the data throughput.

High-rate reading and display of the regions of interest driven by an automated facility or by the man-machine interface 40. These regions of interest are defined in various ways as a function of the mission, the operations carried out by each man and the state of the vehicle either while on the move or in a fixed position. For example, a craft commander will monitor the sectors of potential threats, a gunner will be able to employ an image covering the sector of his sighting direction, a vehicle driver will be able to employ an image covering the fore sector ahead of the vehicle on the move (or aft sector when travelling in reverse or to have a rear view function). When the vehicle is travelling forward, image processing software based on optical flow analysis can automatically display the newly discovered sectors of the scene for the craft commander. When the vehicle is stationary, image processing software can automatically detect the events in the scene (appearances, disappearances, motion detections) while generating alerts for the crew, detection blips and tracks on a situation screen presenting the environment of the vehicle and while thus generating images at high rate and full resolution to allow the operator to discern whether or not there is a threat and engage the reaction. Finally the vehicle or the network in which it sits can be equipped with other sensors able to generate alerts and objective designations for which our system will be able to deliver an image of the angular sector to the operators.

The sensor 10 and the computer 20 ensure real-time processing functions of various types:

- Low-level processing of the signals arising from the detector so as to process the noise sources and to restore in their larger dynamic range the signals.
- Processing for compensating for the distortions of the optical combination and of the detector by algorithmic means utilizing the definition of the focal length of the lens as a function of the sector of the displayed image, so as to deliver on a screen 30, images or sub-images as a function of the angles of elevation and bearing actually covered by each image element or pixel.
- Processing of the images consistently with the information of the platform and as a function of the environment in order to ensure varied functions such as detection, alarm generation inlaid into the image displayed according to the reference frame of the platform.
- Processing for adapting the dynamic range of the detected image to that of the display means and/or to that of the eye, so as to restore the images on these screens or man-machine interfaces 30, meeting the ergonomic and operational needs of the users. Thus for example the system detects the peak illuminations, or the overilluminations saturating the pixels, pointlike or quasi-pointlike in the image. They are to be associated for example with the Sun by day, with lampposts and beacons at night. These zones are displayed in white on the image and do not contribute to the automatic control of the exposure time and of the gain described above. Moreover, in the case of very strong dynamic range of the scene, for example in the presence of zones in full sunlight and simultaneously of dark zones in shadow, the display of the image restores the high spatial frequencies (the details of the image) and compensates for the variations of luminances at low spatial frequency for example through the fuzzy mask technique or by multi-zone normalization or by wavelet filtering.

The processing actions carried out by the system 100, and distributed between the sensor 10, the computer 20 and the MMI 30 and 40 are as follows:

- The lens of the sensor furthermore comprising a diaphragm, control of the opening and closing of the diaphragm (if any) of the sensor, temperature control of the sensor, demisting and deicing of the front diopter of the lens, control for focusing the lens.
- Control of the exposure times,
- Control of the gain of the detector,
- Management of the displays of the images of widescreen panorama, radar, magnifying glass type on sectors of the image or zones of interest with correction of distortions and vehicle motions.

These controls of the exposure times, of the gain of the detector, of the displays, are for example carried out successively. By default the diaphragm of the sensor is for example closed and the exposure time and the gain are at the minimum; the histogram of the image is then made, which in this instance is a black image. Next the diaphragm is opened, and the histogram of the image obtained is made while verifying that it is spread from the lowest level to the highest level. Next, the diaphragm being open, the exposure time is increased: if it is not sufficient (that is to say if the histogram is not suitably spread), the exposure time, and optionally the gain, are further increased. Conversely, it is possible to start from a white, totally saturated, image. As indicated above, it is also possible to dispense with the diaphragm and adjust the exposure time and the gain. It is also possible to use a filter that is applied to the lens to attenuate the signal and/or limit the spectral band.

It is also possible to cite as processing actions carried out by the system 100, and distributed between the sensor 10, the computer 20 and the MMI 30 and 40:

- Inlaying of the context data into the image (North, Direction of the speed vector, mapping, positions of friends, zones of threats, etc.).
- Automatic detection of events, motions and novelties in the image (arising from the scene) so as to generate alarms and inlay them into the restored image.
- Display of windowed images with correction of distortions and motions of the vehicle.
- Implementing of transparent armored function with collimated micro-display goggles, strapped onto the helmet and controlled by control of the orientation of the user's head in the terrestrial reference frame strapped to the vehicle.
- Function of display in mosaic form, in the terrain reference frame of the set of images acquired of the ground (or in 3 D of the terrestrial panorama) during a movement and restoration of these images in the terrain or vehicle reference frame.
- Distribution of the images and of inlays delivered by each user to the remainder of the crew for example to allow the vehicle commander to indicate the direction in which the driver should engage or indicate to the gunner the zones to be monitored with his sighting means.
- During movement, cropping of the newly unmasked zones of the image, through automatic processing detecting the discontinuities of the optical flow in the image or by means of a keyboard or joystick by the operator.
- Sending of objective designations to weapons systems for example.

The sensor 10 being secured to the vehicle, the computer 20 is preferably provided with means for carrying out:

- A stabilization of the image in a strapdown inertial reference frame (screen mounted on vehicle) or zoom situation with a magnification>1, by means of software for image stabilization on inertial reference or on detection of the global motions of the image.
- A direct output with a limited delay for displaying the images on a collimated screen with a magnification of 1, secured to the vehicle (same reference frame as the vehicle).
- An output compensating for the relative motions between the sensor and the collimated screen (turret motion, probe platform, etc.) and processing the delays between acquisition and display of the images,
- An output compensating the relative motions of the user's head in relation to the platform by means of a "Head Tracker" device mounted on the head and looking at reference points in the cabin, or mounted in the cabin, or else of an inertial sensor mounted on the head and of an inertial sensor mounted on the vehicle and of a differential computation between the two.

This offers the possibility of consolidating the set of images of the ground acquired on the move, making it possible to enable vision of the ground or of the roadway, including on foot or under the vehicle thus affording a total vision capability.

Furthermore, on the move, measurement of the discontinuities of the optical flow in the image makes it possible to detect the unmasked zones and thus to attract the crew's attention to the fields to be monitored liable to unmask new threats.

The image display means are either specific to the system, or use already existing display means for which adaptations are carried out in the processing actions to restore utilizable images. These image display means can be of flat screen (or multi flat screen) type, optionally tactile, collimated screen type, or else collimated micro-screens secured to the head or strapped to the helmet. They can be integrated into existing observation systems such as episcopes or tank commander camera restoration means. These screens and displayed images meet the particular needs of each vehicle and of its crew having regard to their missions.

The system according to the invention can comprise 2 or 3 sensors so as to manage possible problems of masking of the platform or to offer stereovision capabilities.

The system according to the invention affords day and night panoramic vision in real time for the crew of an armored vehicle. It meets multiple needs for perception of the environment and for protection of the crew in relation to potential threats. It allows the recognition:
  of a sniper on a building 25 m high, up to a distance of 150 m,
  of a tank at 500 m,
  of a 30-cm object (Mine, IED) placed on the ground 20 m away.
So as by priority to:
  ensure the protection of the crew,
  support the cooperation of the parties,
  acquire tactical information.
It constitutes an aid to humans and ensures the following functions:
  imaging on the move,
  automatic surveillance while stationary: automatic processing to generate alarms on the detection of a motion or better the classification of a threat,
  recording and reporting of the mission,
  inlaying under augmented reality of the situation arising from the TIS (Tactical Information System). Indeed the vehicle sits within a network sharing information of the digitized battlefield. In this respect it receives and dispatches to the network geolocated information. A great deal of information could thus be inlaid into the panoramic image restored by our system such as the location of friends and the location of threats made by the network for example.
  server of images in non-real time or in real time.
The advantages of the system according to the invention are as follows:
  day and night vision
  protection against multi-threats such as snipers, vehicles, mines
  vehicle recognition range up to 500 m
  5.5 Mpixel mono detector system
  real-time super-hemispheric vision
  panoramic lens with resolution adapted for height
  easy to integrate onto the platform
  low cost
  easy-to-use MMI
  "stealthy" static sensor, since it has no rotating element, therefore not making it possible to know where we are observing
  processing actions: LLL the acronym standing for the expression Low-Light Level, automatic detection, management of the platform motion, locate the zones unmasked with forward travel.

The invention claimed is:

1. A video optronic system with supra-hemispheric vision of a scene, comprising: a sensor with a supra-hemispheric lens, and a matrix detector array situated in the focal plane of the lens, a unit for processing the sensed images, display means for the processed images,
  the matrix detector being one having video rate and comprising:
    i. L×C pixels, with L and C>2000, each pixel employing correlated double sampling and able to ensure a charge-voltage conversion, and
    ii. 2 C parallelized analog-digital conversion elements (or ADCs), each conversion element itself comprising a first ADC with output having low level and large gain and a second ADC with output having high level and low gain,
  wherein the super-hemispheric lens exhibits a focal length f controlled as a function of the angle of elevation, the focal length being longest in the equatorial plane, and has a numerical aperture f/D lying between 0.9 and 1.6, D being the diameter of the lens,
  means for adapting the dynamic range of the sensed image to the dynamic range of the scene, by control of the exposure time, and/or of the gain applied to the signal,
  and wherein the processing unit comprises:
    i. means for correcting the non-uniformities of the detector by means of correction tables adapted as a function of temperature and of exposure time of the detector,
    ii. means of weighted summation, of several neighboring pixels,
    iii. means for compressing the dynamic range of the sensed image as a function of the temporal noise of the detector, increasing with the illumination of the scene, means for adapting the dynamic range of the sensed image to the dynamic range of the display means and/or to that of the eye, by restoration of the high spatial frequencies of the image and compensation of the low spatial frequencies.

2. The video optronic system with super-hemispheric vision as claimed in claim 1, wherein the lens of the sensor comprising a diaphragm, it comprises means for adapting the dynamic range of the sensed image to the dynamic range of the scene, by control of the aperture of the diaphragm.

3. The video optronic system with super-hemispheric vision as claimed in claim 1, further comprising means for defining the focal length and means for correcting the distortions of the lens as a function of a sector of the scene to be displayed, as a function of the needs of the users of the system or as a function of automatic processing actions carried out by the pocessing unit.

4. The video optronic system with super-hemispheric vision as claimed in claim 1, wherein the processing unit comprises means for controlling the exposure time, the gain, and the image rate of the detector as a function of the environmental conditions, means for stabilizing the image as a function of the motions of the system or display means, means for detecting newly unmasked regions of the scene, for detecting and tracking events or motions in the scene, for inlaying into the displayed image information arising from other interfaces.

5. The video optronic system with super-hemispheric vision as claimed in claim 1 which comprises 2 or 3 sensors.

* * * * *